(12) United States Patent
Teodosiu et al.

(10) Patent No.: US 7,594,030 B2
(45) Date of Patent: *Sep. 22, 2009

(54) LOCATOR AND TRACKING SERVICE FOR PEER TO PEER RESOURCES

(75) Inventors: Dan Teodosiu, Palo Alto, CA (US); Nikolaj S. Bjorner, Palo Alto, CA (US); Markus M. Breunig, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 633 days.

This patent is subject to a terminal disclaimer.

(21) Appl. No.: 09/952,652

(22) Filed: Sep. 13, 2001

(65) Prior Publication Data

US 2002/0062375 A1    May 23, 2002

Related U.S. Application Data

(60) Provisional application No. 60/252,658, filed on Nov. 22, 2000, provisional application No. 60/252,659, filed on Nov. 22, 2000.

(51) Int. Cl.
*G06F 15/16* (2006.01)

(52) U.S. Cl. .................. 709/245; 709/203; 709/219; 709/227

(58) Field of Classification Search .............. 709/201, 709/203, 204, 205, 206, 207
See application file for complete search history.

(56) References Cited

U.S. PATENT DOCUMENTS

| | | | |
|---|---|---|---|
| 4,914,571 A | 4/1990 | Baratz et al. | |
| 5,224,205 A * | 6/1993 | Dinkin et al. | 709/226 |
| 5,675,802 A | 10/1997 | Allen et al. | |
| 5,946,680 A | 8/1999 | Shorter et al. | |
| 6,098,078 A | 8/2000 | Gehani et al. | |
| 6,138,124 A | 10/2000 | Beckhardt | |
| 6,151,624 A | 11/2000 | Teare et al. | |
| 6,304,913 B1 | 10/2001 | Rune | |
| 6,374,289 B2 * | 4/2002 | Delaney et al. | 709/203 |
| 6,427,165 B1 * | 7/2002 | Anderson | 709/217 |
| 6,598,049 B1 | 7/2003 | Moriyama | |

(Continued)

FOREIGN PATENT DOCUMENTS

EP    0 844 768 A2    5/1998

(Continued)

OTHER PUBLICATIONS

Jussi Kangasharju et al., "Locating Copies of Objects using the Domain name system", 1999, pp. 1-12 (cited in applicant's IDS).*

(Continued)

*Primary Examiner*—John Follansbee
*Assistant Examiner*—Dhairya A Patel

(57) ABSTRACT

A resource naming service (RNS) server receives peer resource requests from peer platforms through a networking environment. The RNS server, possibly in cooperation with other RNS servers and peer registrars generates a response to the request to enable the peer platforms to access the requested peer resources. In one embodiment, a response includes a list of locations of peer devices in the networking environment where a resource is expected to be available. A requesting device can then choose to access the resource from one or more of the listed peer locations.

49 Claims, 8 Drawing Sheets

U.S. PATENT DOCUMENTS

| | | | |
|---|---|---|---|
| 6,636,854 B2 * | 10/2003 | Dutta et al. | 707/10 |
| 6,661,799 B1 | 12/2003 | Molitor | |
| 6,675,205 B2 | 1/2004 | Meadway et al. | |
| 6,907,463 B1 | 6/2005 | Kleinpeter, III et al. | |
| 7,032,000 B2 | 4/2006 | Tripp | |
| 7,165,071 B2 | 1/2007 | Fanning et al. | |
| 7,177,951 B1 | 2/2007 | Dykeman et al. | |
| 2002/0073204 A1 * | 6/2002 | Dutta et al. | 709/227 |
| 2003/0135630 A1 | 7/2003 | Murrell et al. | |
| 2005/0102364 A1 | 5/2005 | Ozzie et al. | |
| 2006/0149806 A1 | 7/2006 | Scott et al. | |

FOREIGN PATENT DOCUMENTS

| | | |
|---|---|---|
| EP | 0 993 163 A1 | 4/2000 |
| WO | 0021075 A1 | 4/2000 |

OTHER PUBLICATIONS

Kangasharju et al., "Locating Copies of Objects Using the Domain Name System", XP-002197618.

Anderson et al., "Serverless Network File Systems", XP 000584821.

Mockapetris, "RFC 1035 Domain Names—Implementation and Specification", XP-002917155, Nov. 1987.

Vixie et al., RFC 2136, "Dynamic Updates in the Domain Name System (DNS Update)", XP-002174064, Apr. 1997.

Clarke, "A Distributed Decentralised Information Storage and Retrieval System", XP-002177459, 1999.

Waldman et al., "Publius: A robust, tamper-evident, censorship-resistant web publishing system", XP-002209193.

Email message from freshd@freshmeat.net, Newsgroups: fm.announce, XP-002180649, Mar. 18, 2000.

Brisco, RFC 1794, "DNS Support for Load Balancing", XP-002209416, Apr. 1995.

Email message from Matthew Schalit (mschalit@pacbell.net), "Re: private nets?", XP-002209417, Oct. 28, 2000.

Fitzgibbon, "Distributed Computing: Moving from CGI to CORBA", XP-002179789.

Sheltzer, A. B., et al., "Name Service Locality and Cache Design in a Distributed Operating System", Proceedings of the International Conference on Distributed Computing Systems, IEEE, 1986, pp. 515-522.

Kangasharju, J., et al., "Locating Copies of Objects Using the Domain Name System", Proceedings of the 4th International Caching Workshop, 1999, pp. 1-12.

International Preliminary Examination Report for PCT International Application No. PCT/US01/50889, Jul. 15, 2003, pp. 7.

International Preliminary Examination Report for PCT International Application No. PCT/US01/50891, Sep. 15, 2003, pp. 5.

International Preliminary Examination Report for PCT International Application No. PCT/US01/49433, Nov. 12, 2003, pp. 5.

European Examination Report for European Application No. 01 985 630.1-2413, May 11, 2007, pp. 4.

Notice of Rejection for Japanese Patent Application No. 2002-545358 mailed on Jan. 30, 2007, pp. 6.

* cited by examiner

```
┌─────────────────────────────────────────┐
│                                         │
│           MACHINE                       │
│           READABLE                      │
│           MEDIUM                        │
│             820                         │
│         ┌───────────────────┐           │
│         │     MACHINE       │           │
│         │    EXECUTABLE     │           │
│         │   INSTRUCTIONS    │           │
│         │        810        │           │
│         └───────────────────┘           │
│                                         │
└─────────────────────────────────────────┘
```

FIG. 8

LOCATOR AND TRACKING SERVICE FOR PEER TO PEER RESOURCES

RELATED APPLICATIONS

The application claims priority to provisional patent application No. 60/252,658, titled, "A Locator and Tracking Service for Peer-to-Peer Resources," filed Nov. 22, 2000, and provisional patent application No. 60/252,659, titled "A Universal Naming Scheme for Peer-to-Peer Resources," also filed Nov. 22, 2000, both of which are hereby incorporated by reference.

This application is related to U.S. application Ser. No. 09/952,808, filed on Sep. 13, 2001, titled "Universal Naming Scheme for Peer to Peer Resources".

This application is related to U.S. application Ser. No. 09/952,367, filed on Sep. 13, 2001, titled "Resource Coherency among Resources Cached in a Peer to Peer Environment".

FIELD OF THE INVENTION

The present invention pertains to the field of networking. More particularly, this invention relates to peer-to-peer networking.

BACKGROUND

Data networks are based on "client-server" interactions. Servers provide, or serve, access to various network resources. Clients request access to the resources from the servers. An Internet Service Provider (ISP) is one example of a server. Clients request access to the Internet from the ISP and the ISP provides access. Once a client has access to the Internet through the ISP, the client may request access to a virtually endless variety of additional resources provided by millions of different servers on the Internet.

In a traditional client-server environment, resources are often concentrated in a relatively small number of centralized servers that service requests from a much larger number of clients. Concentrating resources on a few servers in this traditional approach has its drawbacks. For instance, the servers need to run on very fast machines that can process large volumes of client requests. A server machine and a network connection that can handle simultaneous transactions with thousands, or even millions, of clients is likely to be very expensive to purchase and maintain.

Furthermore, during times of exceptionally high network traffic, even the fastest centralized servers can become bottlenecks in the network. For instance, as a nationwide news story breaks, the amount of time it takes to access the latest updates at most news websites tends to increase dramatically due to the increased network traffic. Moreover, if one of these large-scale centralized machines fails for any reason, millions of clients will be denied access to the desired resource. This vulnerability makes centralized servers prime targets for hackers and cyber-terrorists.

A less traditional approach to networking is based on peer-to-peer interactions. In a peer-to-peer environment, transactions take place between end-user, or peer, machines. Each peer can be both a consumer and a provider of resources. That is, a peer can act like a traditional client by requesting access to a resource stored elsewhere, and the same peer can also act like a traditional server by responding to a request for a resource stored at the peer.

Peer-to-peer networking theoretically has a number of advantages over the traditional approach. Rather than funneling huge volumes of client transactions to centralized servers, multiple peers can work together to replace entire servers. For instance, if a resource is copied and cached on many peer machines, a request for the resource can be serviced by any one of the peers, or even by several of these peers at the same time, by having each of the multiple peers only serve a portion of the resource, in order to maximize the aggregate download bandwidth for the resource. By spreading resources out over multiple peers, bottlenecks at centralized servers can be reduced. Also, end-user peer machines tend to be comparatively inexpensive and are already present in most networking environments. Using the available, cumulative processing power and available bandwidth of peer machines can substantially decrease the overall cost of a network by reducing the number of expensive, centralized servers.

An additional benefit of a peer-to-peer networking approach is the frictionless publishing of content. Given that in a peer-to-peer system, every peer machine can be both a consumer and a publisher of information, publishing information in such a system can be as easy as creating a new file. This completely eliminates the friction involved with publishing content in a client-server environment (such as, for instance, the steps involved in publishing on a corporate Intranet portal), and thus encourages users to share more content with each other. This type of sharing is especially relevant in an Intranet context that is made up of "islands of information" (such as user desktops and laptops) that contain up-to-date, enterprise-critical information that is normally never shared by users.

Unfortunately, most traditional approaches to managing network traffic and resources do not conveniently accommodate peer-to-peer networking. For instance, locating servers on the World Wide Web relies on the Domain Name System (DNS). DNS is a well-established hierarchical scheme used for naming Internet hosts, or servers. DNS was designed to resolve host names to Internet Protocol (IP) addresses. That is, DNS resolves the host name part of URLs that are meaningful to humans, such as www.USnews.com, to IP addresses that are meaningful to Internet routers and switches, such as 205.245.172.72. The IP address and related host name of a given host machine are propagated to various DNS servers throughout the Internet so that client requests made using the host's name (such as requesting a URL containing that particular host name) are appropriately routed to the correct IP address. Propagating or updating this information can take a comparatively long period of time, on the order of several hours or even days.

DNS works well for locating network resources that are all available at one particular host, and for hosts that have relatively static IP addresses.

Peers, however, often have dynamically allocated IP addresses. That is, each time a peer logs onto the Internet, the peer is likely to have a different IP address. For instance, a corporate user may alternatively connect their laptop to the Internet from the office or from home, using two different IP addresses, none of which may be statically assigned (assuming both the enterprise and the ISP use Dynamic Host Configuration Protocol (DHCP) for assigning host addresses). It is not uncommon for the duration between peer log-ons to be shorter than the time period needed to propagate a new IP address through the DNS system. In which case, most of the time, it would not be possible or not reliable to find a peer by using its DNS host name.

Furthermore, a peer-to-peer resource that has been copied and cached may be simultaneously available at many locations. In a corporate Intranet environment, this could be the case for a marketing report that is accessed by several users.

Caching resources is advantageous for a number of reasons. Firstly, it promotes availability of resources. For instance, if resources published from a laptop are systematically cached on an enterprise server, these resources will continue to be available after the publisher closes their laptop and leaves for the day. Secondly, caching allows resources to be kept "closer" (in terms of network topology) to where they are used. For instance, in a geographically distributed enterprise it may be advantageous to cache "hot" documents in each office location, to provide better response times when accessing those documents.

As new versions of the resource are created however, old copies of the resource stored on other peers become outdated, and should be invalidated (i.e. not used any longer) as the new version propagates among the peers. This illustrates another shortcoming of DNS, its inability (due to a lack of a fine-enough granularity) to keep track of individual resources, and to track resources that can be available at multiple locations, locations having dynamically changing IP addresses, and locations that potentially store different versions of the same resource.

Furthermore, in the presence of multiple peer copies for the same resource, it is important to be able to select a small set of "best", or "closest", copies for a given request. This ability requires tracking of all equivalent peer locations that have an up-to-date copy of and can serve the cached resource.

BRIEF DESCRIPTION OF THE DRAWINGS

Examples of the present invention are illustrated in the accompanying drawings. The accompanying drawings, however, do not limit the scope of the present invention. Similar references in the drawings indicate similar elements.

FIG. 8 illustrates one embodiment of a machine readable storage medium to store machine readable instructions of the present invention.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Overview

A number of inventions are described below with respect to a Resource Naming Service (RNS) that is used to track and locate resources among peers in a peer-to-peer networking environment. RNS relies on a resource naming scheme that uniquely identifies peer resources no matter where among the peers the resources may currently be available. RNS overcomes the inadequacies of existing networking schemes, such as the Domain Name System (DNS) based naming, making it possible to take full advantage of the power of peer-to-peer networking.

Figure 1:
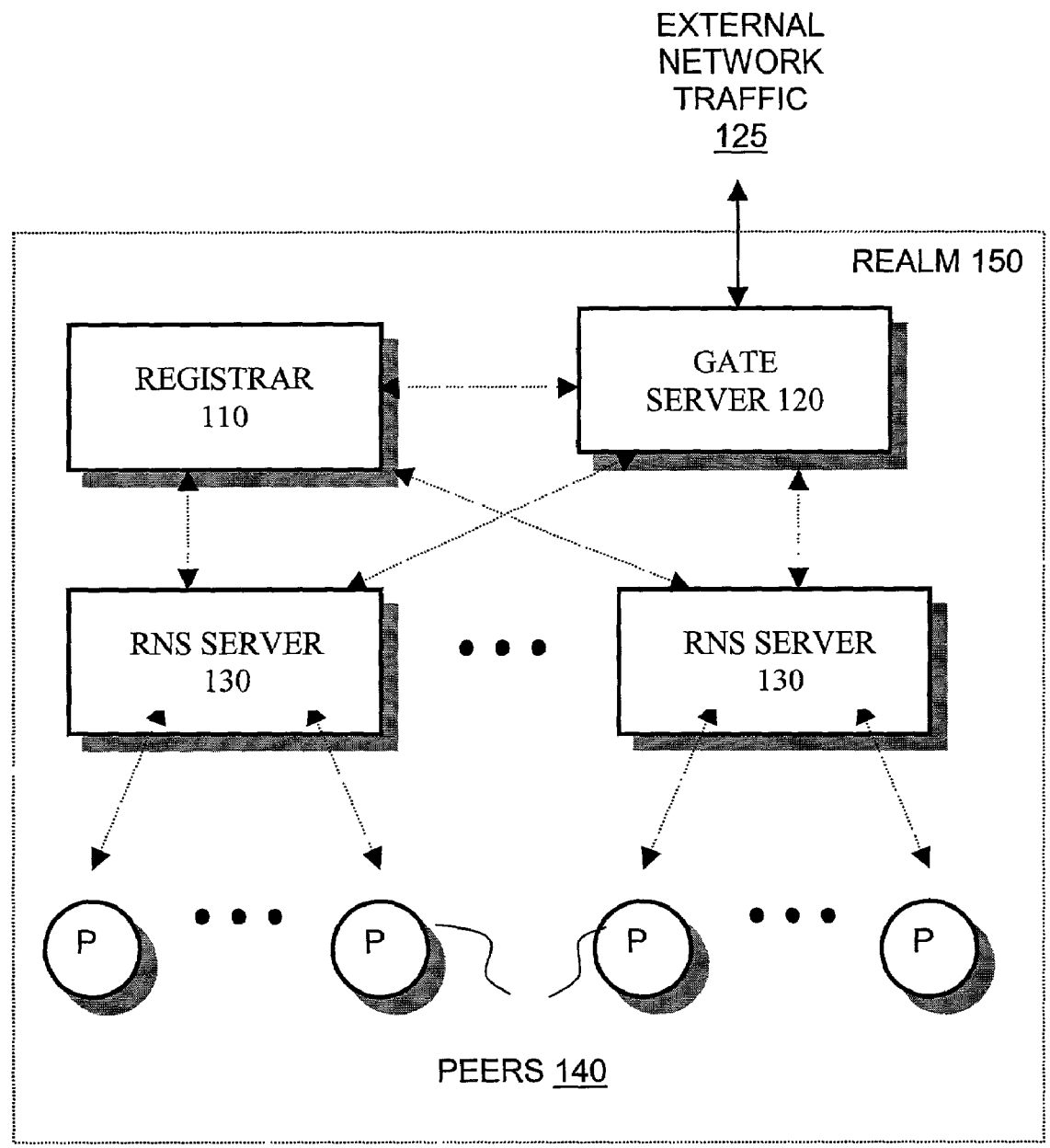
FIG. 1 illustrates one embodiment of a peer-to-peer realm.

FIG. 1 illustrates one embodiment of the inventive peer-to-peer network. In the illustrated embodiment, peer-to-peer realm 150 (hereafter simply called "realm") includes registrar 110, gate server 120, a number of RNS servers 130, and a number of peers 140. Peers 140 store, or otherwise make available, peer resources (not shown). Registrar 110, RNS servers 130, and gate server 120 together provide a locator and access service for tracking, locating, and accessing the peer resources published in the realm. While one each of the registrar and gate server, and several RNS servers and peers are shown in FIG. 1, the present invention may be practiced with any number of these elements.

To participate in the realm, each peer 140 first registers with registrar 110. As part of the registration process, registrar 110 assigns each peer an identifier that is unique within realm 150, and also assigns each peer to a particular RNS server 130, hereafter called the "home RNS server" for that peer. The unique identifier for a given peer 140 is used to identify peer resources within realm 150 that are under the control of, or published by, the peer.

Any number of approaches can be used to register peers 140 with registrar 110. In one embodiment, peers 140 may use a Web-based registration process to obtain and register an identity with registrar 110. Registration may comprise a series of interactions between a peer 140 and registrar 110 to convey a user's identity, encryption keys for secure communications among elements within realm 150, billing information for access various peer resources, downloading and installing software to enable the peer 140 to be compatible with its assigned RNS server, and the like.

Any number of approaches can also be used by registrar 110 to select a home RNS servers for a particular peer 140. In one embodiment, registrar 110 identifies the type, or version, of software that the peer 140 is using, and generates a list of RNS server 130 that are compatible with that software and that are estimated by registrar 110 to be "close" to the registering peer 140 in terms of network topology. Then, registrar 110 provides this list of candidate RNS servers to the peer 140 so that the peer 140 can test the network paths to each listed RNS server and identify one or more that have the best response times. That is, depending on network topology, the peer 140 is likely to be "closer" to some RNS servers than others, either by physical distance or by the speed of the network medium. In one embodiment, the peer's selection is returned to registrar 110 merely as a suggestion. That is, registrar 110 may or may not assign the peer 140 to the RNS server 130 that the peer selected depending on factors such as the relative network traffic loads among the list of candidate RNS servers. In which case, registrar 110 may only assign the suggested RNS server to be the home RNS server for the peer 140 if the suggested RNS server's relative network traffic load is below a particular level. Otherwise, the registrar may assign a different RNS server having, for instance, a lowest relative network traffic load among the candidate RNS servers.

Registrar 110 can also register new RNS servers in realm 150 using many of the same techniques and reassign selected peers 140 to be homed at the new RNS server. That is, in one embodiment, registrar 110 assigns a unique identifier for the RNS server, identifies a set of compatible peers 140, allows the new RNS server to suggest a set of preferred peers, and then selects a set of peers to be homed at the new RNS server based on the suggestion as well as other factors. In alternate embodiments, any number of techniques can be used to register new RNS servers and assign peers. For instance, the new RNS server may simply be allowed to accumulate new peers over time as new peers register with registrar 110.

Each RNS server 130 tracks the current network location (in terms of IP addresses and IP port numbers) and status (on- or off-line) of all peers assigned to that RNS server, as well as the locations and availability of resources among its assigned peers.

In general, accessing a resource is a two step process. First, the resource must be located using the locator service. Second, the resource is actually accessed at the location or set of locations returned by the locator service.

For a peer 140 within realm 150, the first step in accessing a peer resource involves communicating with the peer's assigned home RNS server 130. The home RNS server 130, possibly in cooperation with registrar 110 and another RNS server 130, determines one or more locations within realm 150 where the resource is expected to be available. In one embodiment, the set of locations returned by the home RNS server 130 to the requesting peer 140 may depend on the current network identity (in particular, the current IP address or IP addresses) of peer 140, on the current traffic load on the realm, as well as on other parameters that are known to the RNS servers 130. It is up to the peer 140 to take the second step to actually access the resource at the provided location (s). Once a peer has accessed a resource, it has the option to cache the resource, inform its home RNS server that it is now caching the resource, and make the cached resource available for other peers to access.

Client devices are considered to be outside realm 150 if they have not been endowed with the teachings of the current invention, or if they have not been registered with the registrar 110 of this realm 150. Such devices may be able to access information from the current realm 150, but will usually not be able to publish information in this realm.

For a client device outside realm 150, external network traffic 125 is directed to realm 150 through gate server 120. Gate server 120, possibly in cooperation with registrar 110 and one or more RNS servers 130, determines one or more peer locations 140 within realm 150 where the resource is expected to be available, in accordance to the resource location process described above. Depending on whether the client device is compatible with the peer(s) hosting the resource, gate server 120 may simply respond with the location(s) and allow the client device to directly access the resource on its own. If the client device is not compatible, gate server 120 may take any number of actions, such as accessing the resource on behalf of the client device and responding as if the gate server were the resource.

As used herein, each resource is primarily associated with one peer, referred to as the master publisher, and may also be available at additional peers, referred to as the caching publishers. Usually, only a master publisher has the authority to publish, modify, or delete a resource.

The locating service presumes a resource addressing scheme that uniquely identifies the master publisher of a resource in the resource address and includes a relative path for the resource with respect to the master publisher. The addressing scheme is unique, however, in that an address does not necessarily direct a request to the master publisher itself, but instead to a resource locating service corresponding to the master publisher.

Using this "diverted" addressing scheme, the locating service can direct a request to the master publisher as well as to any number of caching publishers. Even if the master publisher of the resource is not on-line, has crashed, is overwhelmed with other traffic, or is otherwise not immediately available, the resource may still be persistently available from a caching publisher. With potentially many peers caching resources, or with dedicated peers proactively caching resources, the locator service can persistently and reliably service huge volumes of requests.

The locator service can also track resources stored by peers having dynamically changing addresses. For instance, in one embodiment, peers 140 include machines that use modems to connect to the network through an Internet Service Provider (ISP). Each time one of these peers connects to the Internet, the ISP assigns it a new IP address using, for instance, the Dynamic Host Configuration Protocol (DHCP). And, each time one of these peers connects, the peer contacts its home RNS server to let it know what its current IP address and port number are. The home RNS server can then update any records it has for the peer with the new location. Then, while it is logged on, the peer periodically "pings" its home RNS server to let the server know the peer is still logged on. When and if the pings stop, the home RNS server updates its records to show that the location has become inactive. In alternate embodiments, any number of approaches could be used to track the current locations and availability of transient and/or mobile peers.

Locating Resources

Figure 2:
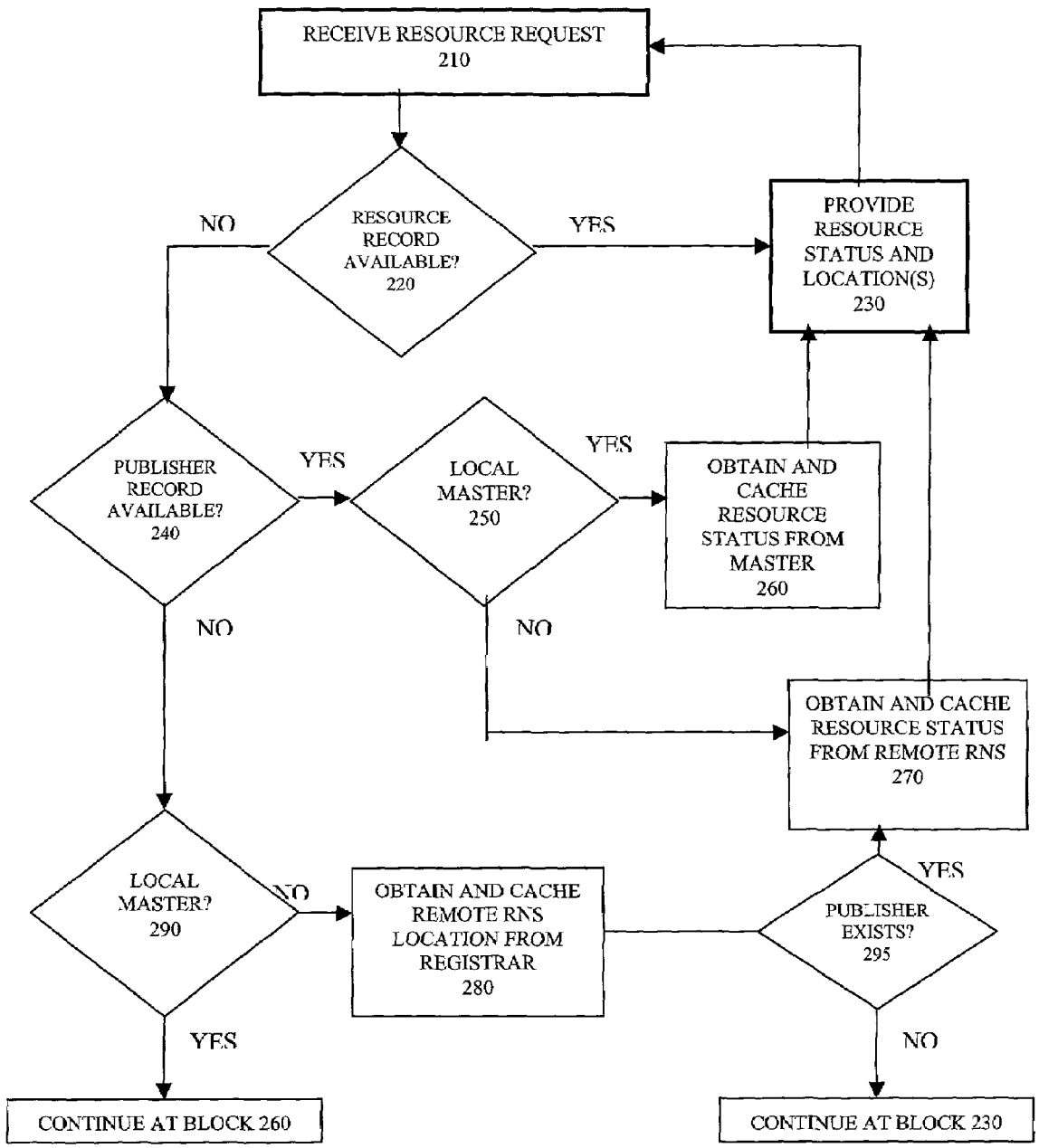
FIG. 2 demonstrates one embodiment of locating a peer resource from the perspective of an RNS server.

FIG. 2 illustrates one embodiment of locating a resource in more detail. The illustrated embodiment is from the perspective of an RNS server, although a gate server may perform similar functions. FIG. 2 includes a number of implementation specific details. Other embodiments may not include all of the elements illustrated in FIG. 2, may perform elements in a different order, and may include additional elements.

First, the RNS server 130 receives, from a peer 140 or from the gate server 120, a resource request at 210 for the location of a particular resource. The request uniquely identifies a resource and a master publisher of the resource within the realm to which this RNS server belongs. The request can take any number of forms from a messaging protocol specific to this particular locator service to a universally accepted protocol such as HTTP.

At 220, the RNS server checks its own memory to determine if it has a resource record corresponding to the requested resource. In one embodiment, resource records comprise unique identifiers for resources and master publishers as well as one or more locations where the resources are expected to be located. The record may also indicate whether or not particular locations are expected to be active (logged into the network or not). In which case, the RNS server compares the unique identifier from the request to the list of recorded unique identifiers.

If the RNS server does have a matching record, the RNS server assumes that the record is current. If the record lists an active location for the resource, the RNS server responds in 230 with the resource status and a set of locations. The record may list zero or more active locations where the resource has been cached. If the record lists more than one active location for the resource, the RNS server may respond with multiple locations from which the requester can choose. For successive requests for the same resource, the RNS server may respond with different sets of locations, selecting sets of locations in, for instance, a round robin fashion, in order to balance the network traffic to multiple locations. In one embodiment, the RNS server may select the locations to be returned in 230 based on the requester's network (IP) address, in order to provide the requester with addresses that are "proximal" in terms of network topology, and thus optimize network traffic.

If the RNS server does not have a matching resource record, or if the RNS server has a matching resource record that does not actually list any active locations for the resource, the RNS server checks its memory to determine if it has a publisher record for the publisher of the requested resource in 240. In one embodiment, publisher records comprise unique identifiers for master publishers as well as an identifier for the home RNS server to which the master publisher was assigned. In which case, the RNS server compares the unique identifier from the request to the list of recorded publisher identifiers.

If the RNS server does have a matching publisher record, the RNS server assumes that the record is current and, in 250, determines whether or not the master publisher is local. That is, the RNS server determines whether or not it is the home RNS server for the master publisher.

If the master publisher is local, the RNS server obtains from the master publisher and caches (by creating an internal resource record) status information for the resource in 260 and provides the resource status information to the requester in 230. The status information could include whether or not the master publisher is currently active (logged in to the network or not) and whether or not the resource still exists. In order to determine whether or not a resource exists on an active master publisher, the RNS server queries the master publisher. If the master publisher indicates that the resource exists, the RNS server creates a record for the resource, including the location of the publisher, and caches the record so that subsequent requests for the resource can be satisfied without communicating again with the publisher.

The RNS server may know from its publisher record whether or not a local publisher is active. For instance, in one embodiment, local publishers log in to the RNS server each time they come on-line on the network, and then "ping" the RNS server on a regular basis to let the RNS server know the local publisher is still active. In alternate embodiments, any number of approaches can be used to determine whether a master publisher is active, including a query from the RNS server, a publisher logout procedure, and the like.

If a local publisher is determined to be inactive, the RNS server can update any records it has associated with that publisher. That is, any record for any resource that lists a particular publisher as a source can be updated to show that the publisher is not active. Of course, if the resource does not exist and/or the master publisher of the resource is inactive, the RNS server will return an appropriate error message in 230.

If, in 250, the master publisher is not a local publisher, but the RNS server discovered a publisher record in 240, the RNS server queries the remote RNS server (i.e. the assigned home RNS server for the master publisher) with an identifier of the master publisher and the resource to obtain and cache (by creating a resource record) the status information returned by the remote RNS server for the resource in 270. The remote RNS server may be able to immediately respond to the query based on its own memory records. For instance, the remote RNS server may have records including additional active locations where the resource is expected to be available. If the remote RNS server does not have a record of any active locations for the resource, the remote RNS server may be able to query the master publisher if the master publisher is currently active. Based on the response from the remote RNS server, the local RNS server provides a response in 230. Again, if the resource does not appear to exist, or if the resource is not currently available, the RNS server will respond accordingly. Also, the local RNS server will cache whatever it learns from the remote RNS so that future requests for the resource can be serviced without resorting to the remote RNS. In one embodiment, caching information about resources published by master publishers homed at a remote RNS server can be implemented on a leasing basis, i.e. the cached information can be assumed to be valid for a specified time after it was obtained from the remote RNS server; additional requests for cached information during that time can then be serviced without contacting the remote RNS server.

If, back in 240, the RNS server determines that it does not have a publisher record for the resource, the RNS server in 290 determines if the master publisher is a local publisher (i.e. if this is the home RNS for the master publisher). If the master publisher is homed at this RNS server, the algorithm continues to respond to the request at block 260 as described above.

If at block 290 it is determined that the master publisher is not homed at this RNS server, the RNS server resorts to the registrar 110 in 280. The registrar 110 keeps records of each registered peer and the RNS server to which each peer is assigned or homed at. From the registrar, the RNS server learns whether or not the publisher is registered, and, if so, to what RNS server the publisher has been assigned. Again, the RNS server caches (by creating a publisher record) the information to avoid contacting the registrar for future requests directed to the same master publisher.

Of course, if at 295 the publisher is not registered, there is no remote RNS server to contact in 270, and the local RNS server will return the appropriate message in 230. If, however, the publisher is registered, the RNS server proceeds to contact the remote RNS server in 270 as described above, and to respond to the request in block 230 accordingly.

As mentioned above, one embodiment of an RNS server tracks whether or not peers homed at the RNS server are on- or off-line. The availability of peers can be tracked as part of the publisher records. For instance, a publisher record may be of the form:

unique peer identifier: status/current IP address(es)/ current port number(s)

In the illustrated embodiment, each time a peer logs in to its home RNS server, the RNS server updates the peer's record to indicate that the peer's status is on-line and records the peer's current IP address(es) and port number(s). When the peer is determined to have logged out, the RNS server again updates the peer's record to indicate that the peer's status is off-line.

In alternate embodiments, an RNS server also tracks the status of peers homed at other RNS servers. For instance, status information for a remote RNS server can be cached along with current location information on a leasing basis, such that the status information is presumed valid for a certain period of time.

By tracking the status of peers, an RNS server can persistently maintain resource records as the locations of peers change as, for instance, peers logout and log back in with a new IP addresses.

For example, a resource record entry may be of the form:

unique resource identifier: master publisher identifier;

publisher identifier$_1$; publisher identifier$_2$; publisher identifier$_3$; . . .

When the RNS server receives a request for the resource, the RNS server identifies the corresponding resource record entry based on the unique resource identifier and selects a set of publisher identifiers from among those listed. Then, the RNS server consults the publisher records to determine the current status of the corresponding publishers and returns the current IP addresses and port numbers for each selected publisher who's status indicates that it is on-line.

In another embodiment, a resource record entry is of the form:

unique resource identifier: IP$_1$, port$_1$; IP$_2$, port$_2$; IP$_3$, port$_3$; . . .

In this example, rather than listing the unique identifiers of the publishers of the resource, the resource record lists actual network locations for the resource. In which case, when the RNS server receives a request for the resource, the RNS server selects from among the listed locations and returns the selected locations without the intermediate step of consulting the publisher records to determine which of the selected locations are expected to be on-line. In order to maintain current locations for the publishers as their network locations change, the RNS server scans through the resource records and flags locations corresponding to publishers that are determined to be off-line. When the publishers log back in, the RNS server again scans through the resource records, removes the flags, and replaces the old locations with the current locations.

Of course, RNS servers can organize and utilize records in any number of embodiments. For instance, the resource records and the publisher records may comprise one single list instead of two separate lists. Alternately, publisher records could be further divided into a list of peers assigned to the RNS server plus a separate list of peers assigned to other RNS servers. And, of course, a corresponding variety of mechanisms and approaches can be used to track the current status of publishers and update publisher network locations.

Peer Platform

Figure 3:
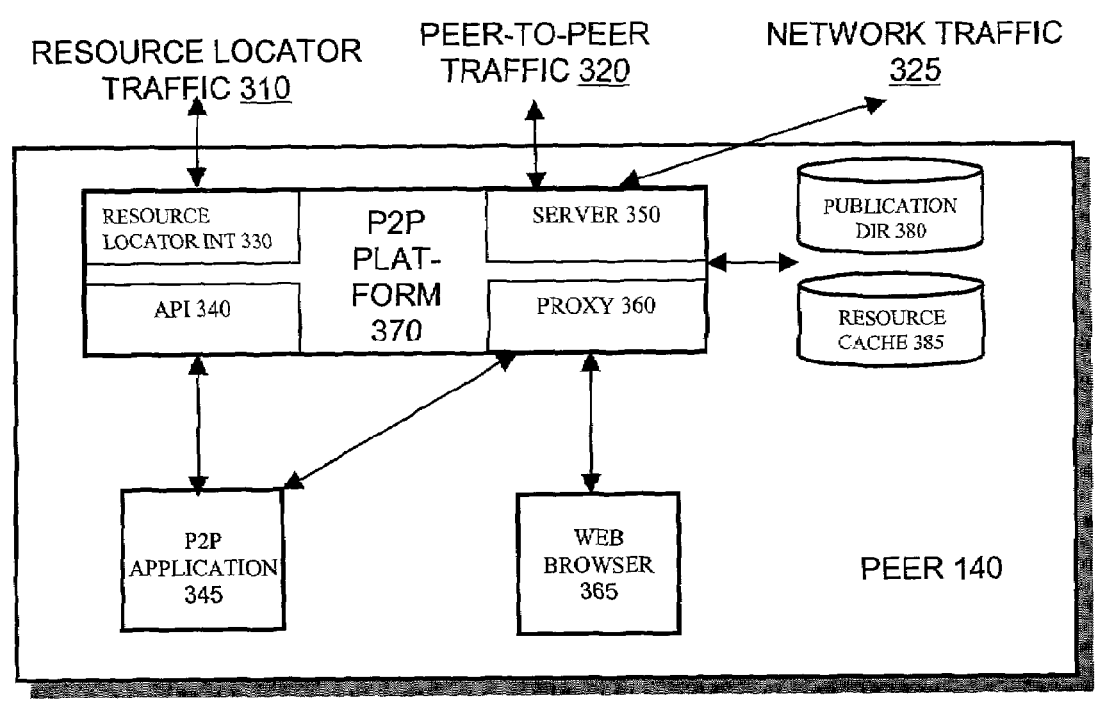
FIG. 3 illustrates one embodiment of a peer.

FIG. 3 illustrates one embodiment of a peer 140 from FIG. 1 in more detail. Peer 140 includes peer platform 370, peer-to-peer application 345, Web browser 365, and two persistent structures, publication directory 380 and resource cache 385.

Peer-to-peer application 345 represents any of a variety of peer-to-peer applications or Web services such as a distributed gaming application where every participant runs a copy of the game software. Browser 365 represents any of a number of Web browsers, such as Netscape Navigator, Microsoft Internet Explorer, and the like. Persistent structures 380 and 385 represent any of a variety of persistent memory devices such as hard disks, flash memory, or the like, addressed and organized in any of a variety of fashions. Other embodiments of peer 140 may include additional elements, may have elements arranged differently, and may not include all of the illustrated elements.

Peer platform 370 intercepts and directs all peer-to-peer traffic 320 and resource locator traffic 310 for peer 140. Peer platform 370 includes resource locator interface 330 to interface directly with locator services, application programming interface (API) 340 to interface with peer-to-peer application 345, server 350 to serve peer-to-peer requests 320 (described more fully below), and proxy component 360 to interface with web browser 365 and with peer-to-peer application 345. In one embodiment, peer platform 370 runs as an application on peer 140, using the operating system services of peer 140 to perform input/output functions, etc. In one embodiment, peer platform 370 is embedded into the operating system or firmware of peer 140.

Referring to FIG. 3, peer platform 370 can "publish" peer resources by placing the resources, or a reference to these resources, in publication directory 380. In one embodiment, publishing can be accomplished by the user through an appropriate User Interface provided by platform 370 (not shown in FIG. 3). In one embodiment, publishing can be performed by peer-to-peer applications 345 by calling the appropriate function in the API 340 of platform 370.

Other devices can browse the contents published by peer 140 by requesting access to the top-level directory or directories published by this peer 140, just like any other resource. Such requests, coming into peer 140 as peer-to-peer traffic 320, may be the result of other users browsing for content, or may be sent at the request of the RNS server, for instance, after a crash as part of a data recovery operation.

Figure 4:
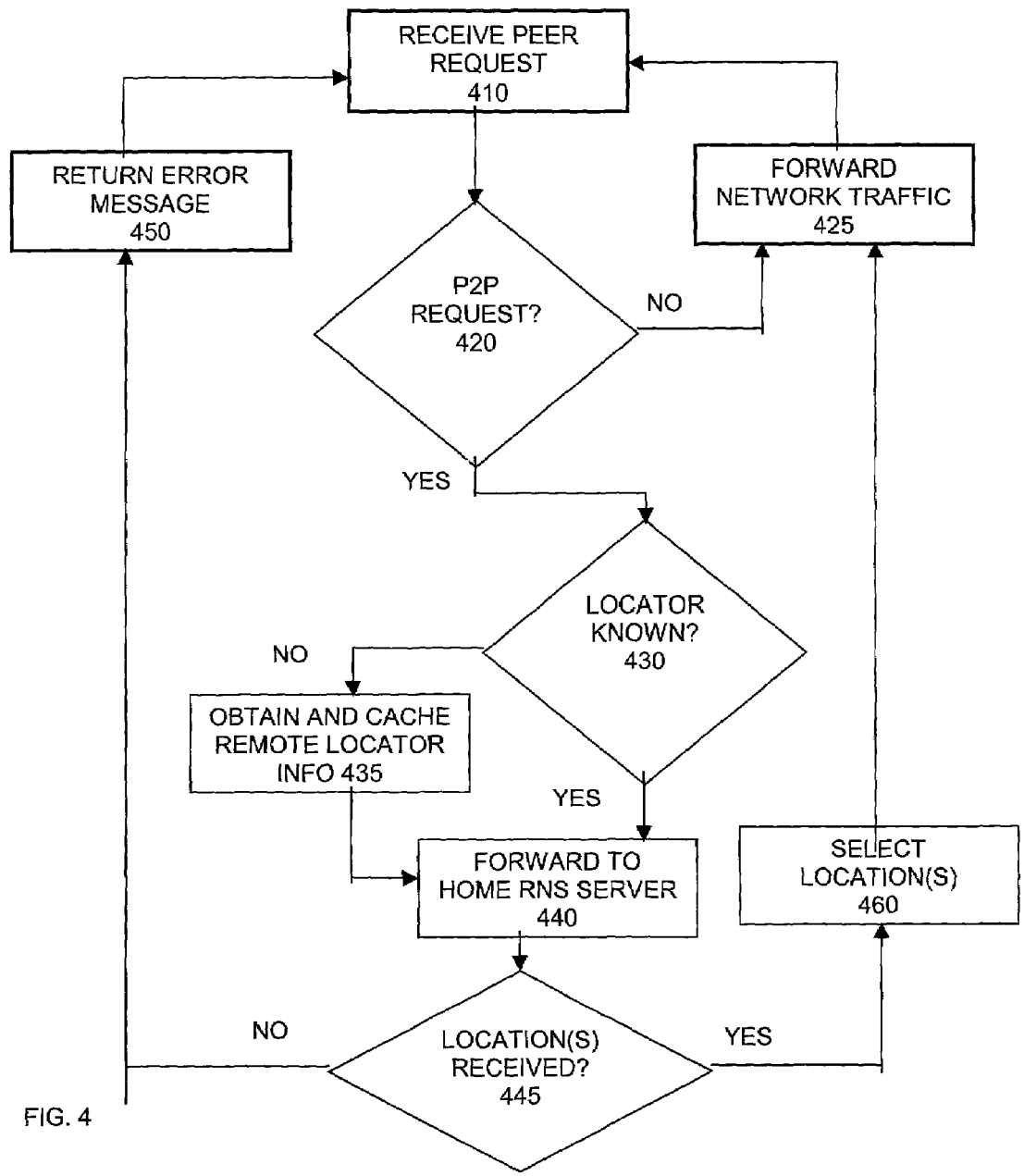
FIG. 4 demonstrates one embodiment of locating a peer resource from the perspective of the peer platform shown in FIG. 3.

FIG. 4 illustrates another embodiment of locating a resource in more detail, this time from the perspective of platform 370. A gate server may perform similar functions. Other embodiments may not include all of the elements illustrated in FIG. 4, may perform elements in a different order, and may include additional elements.

Referring now to FIG. 4, when peer 140 generates a request for a network or peer resource, either from peer-to-peer application 345 or Web browser 365, the proxy component 360 of platform 370 receives the request at block 410.

At block 420, the proxy component 360 checks whether this is a request for peer-to-peer content. If it is determined that the request is for a regular network resource published on the Web or on the Intranet, the proxy component 360 just acts as a pass-through for the request, sending the request to the specified Web server or chaining with any existing proxy used by, or specified for, peer 140, as necessary. In one embodiment, platform 370 makes this determination based on the format of the URL provided by peer 140. In another embodiment, platform 370 makes this determination dynamically, as will be explained later under "Dynamic Peer-to-peer Realm Identification." Assuming the request is a regular network resource, for instance having a URL including "www" for a World Wide Web page, the request is forwarded in 425 as regular network traffic 325.

If, however, the request is for a peer resource, for instance having a URL including "ppp" or "rns", the platform determines whether or not the addressed locator service is known in 430. That is, platform 370 may need certain contact information for contacting the locator service for the realm under which the peer resource has been published, which may or may not be the same realm under which peer 140 has been registered. For instance, platform 370 may need to know the IP address and IP port number for the locator service.

If the locator service is known, the request is directed in 440 as resource locator traffic 310 to the home RNS server 130 to which the peer 140 has been homed during the registration process, as described earlier. The home RNS server 130 then follows the steps earlier described in FIG. 2 to locate content published under its realm, or to contact the remote locator service to locate a remote peer resource.

If the locator service is not known, platform 370 first tries to obtain and cache the needed contact information in 435. In one embodiment, platform 370 sends a request for the contact information to the locator service as regular network traffic 325. The locator service's gate server 120 will receive and process the request. The request can simply contain the original peer resource address requested by peer 140. Alternately, platform 370 indicates in the request that it is a peer-to-peer platform and includes various kinds of information to enable the locator service to advantageously determine compatibility. If the gate service responds with the needed information, platform 370 can cache the information in cache 385 to avoid having to ask for the information again in the future; following this, platform 370 proceeds to forward the request to its home RNS server in 440, including the obtained contact information for the remote locator. If in 435 the locator service is determined not to exist or does not respond, platform 370 cannot forward the request in 440, but instead skips through 440 and 445 to return an appropriate error message in 450.

If the request was forwarded in 440, platform 370 waits in 445 for a response from its home RNS server and checks to see if one or more locations for the resource have been received. If no locations are received, platform 370 returns an appropriate error message in 450. If one or more locations are received, platform 370 selects one or more locations to try in 460. The request is then forwarded as peer-to-peer traffic 320 directly to the selected location or locations in 425. In one embodiment, if the location or locations selected by the client are not available or do not contain the resource, platform 370 could continue trying other locations that were returned in block 445 by the locator service. In one embodiment, if multiple locations are available and able to serve the resource, platform 370 may decide to stripe the fetching of the resource across multiple locations. Platform 370 may use any number of approaches to determine which location to try first. If a location proves to be non-responsive, platform 370 can select another location for the resource from those locations previously cached.

For types of resources that can be copied, once the resource has been successfully accessed, platform 370 has the option to cache a copy of a resource in its cache 385, and thus become a caching publisher for that resource. In which case, platform 370 will also inform its home RNS server via its resource locator interface 330 that it now has become a caching publisher for the resource. The home RNS server will then add the location of the peer to its list of locations for the resource. Future requests for the resource from this peer or from other peers can be directed by the home RNS server to this peer 140 and be serviced out of cache 385.

In addition to receiving requests from peer 140, platform 370 may also receive requests for the cached resource in the form of resource locator traffic 310 and/or peer-to-peer traffic 320. These requests can similarly be serviced out of cache 385.

In the embodiment illustrated in FIGS. 3 and 4, a separate protocol is used for peer-to-peer traffic 320 and regular network traffic 325, on the one hand, and for resource locator traffic 310, on the other. Since messages exchanged during resource location are of a more specific nature than regular network traffic 325 or peer-to-peer traffic 320, the protocol for the resource locator traffic 310 can be made more concise. For instance, rather than using a text-based protocol such as HTTP, the platform 370 could communicate with its home RNS server by using a more bandwidth-efficient binary encoding of messages. These bandwidth savings can be advantageously used to increase the number of peers 140 homed at the same RNS server 130. In alternate embodiments, a single protocol could be used for all types of traffic.

Gate Server

As mentioned above, gate server 120 from FIG. 1 performs some functions similar to those of RNS servers 130 described in FIG. 2 and peer platform 370 described in FIG. 3. That is, if gate server 120 receives a request for a peer resource in the form of a resource address, as peer platform 370 does, gate server 120 takes steps to convert the access to the resource to an appropriate peer-to-peer form.

For a compatible peer device that is requesting the resource, gate server 120 may provide contact information so that the peer's platform can directly send a peer request. In this case, gate server 120 can simply inform the requester that this is a request to a peer resource that requires the requester to contact its home RNS server. A compatible requester is one that will be able to interpret the response from the gate server, then use its home RNS server to resolve the resource location (s), and directly access the provided location(s).

For a non-compatible device, gate server 120 may itself convert the request to peer form and act as a proxy on behalf of the requesting device. In this case, gate server 120 first processes the request much like platform 370 does, and then takes the extra step of accessing the resource on behalf of the requester. That is, if the requester is requesting a copy of a file, the gate server can access a resource, download the file, and forward it to the requester. In this last respect, gate server 120 also performs some functions similar to peers 140 in that the gate server actually accesses the resource.

Peer-to-peer Resource Addressing Scheme

As discussed above, the RNS addressing scheme is an important part of the RNS locator service. In one embodiment, the RNS addressing scheme is entirely compatible with the URL scheme that is currently used for naming World Wide Web resources. That is, links between Web pages and peer-to-peer resources are possible, and the transition from one kind of resource to the other can be completely transparent to a user. For instance, a link in a web page has the same syntactic structure and can be de-referenced by an unmodified Web browser, irrespective of whether the link connects to a traditional Web page or a peer-to-peer resource.

This embodiment of the RNS addressing scheme uses a hierarchical naming scheme similar to Universal Resource Locators (URLs). For instance, like URLs, peer resource addresses can be of the following form:

<access protocol>://<realm>/<peer>/<path>

Examples of access protocols include hypertext transfer protocol (HTTP), hypertext transfer protocol over an SSL (Secure Socket Layer) connection (HTTPS), file transfer protocol (FTP), and the like. The realm corresponds to the peer-to-peer realm 150 under which the peer resource has been published, and is chosen to be identical to the DNS (Domain Name Service) host name of the gate server 120 of that realm 150. Thus realm names are unique in a networking environment just as domain names are unique.

Following the realm in the illustrated embodiment is the peer identifier. This corresponds to the peer identifier for the master publisher of a particular resource. As described earlier, peer identifiers are assigned by a registrar 110 to be unique within a realm 150.

Resources can be further organized into any number of levels of hierarchy based, for instance, on path names for resources within a peer.

Dynamic Peer-to-peer Realm Identification

In one embodiment, a peer-to-peer resource address conforms syntactically to a regular Web URL and cannot be distinguished from a Web URL by any syntactical conventions. Instead, a resource address is dynamically recognized as such when the address is de-referenced. This provides a great deal of flexibility in naming realms. For instance, as discussed above in the embodiment of FIG. 1, external network traffic 125 is received by gate server 120. Gate server 120 can resolve resource addresses and instruct the senders on how to query the resource locator, or gate server 120 can resolve resource addresses and access the resources on behalf of the senders.

Figure 6:
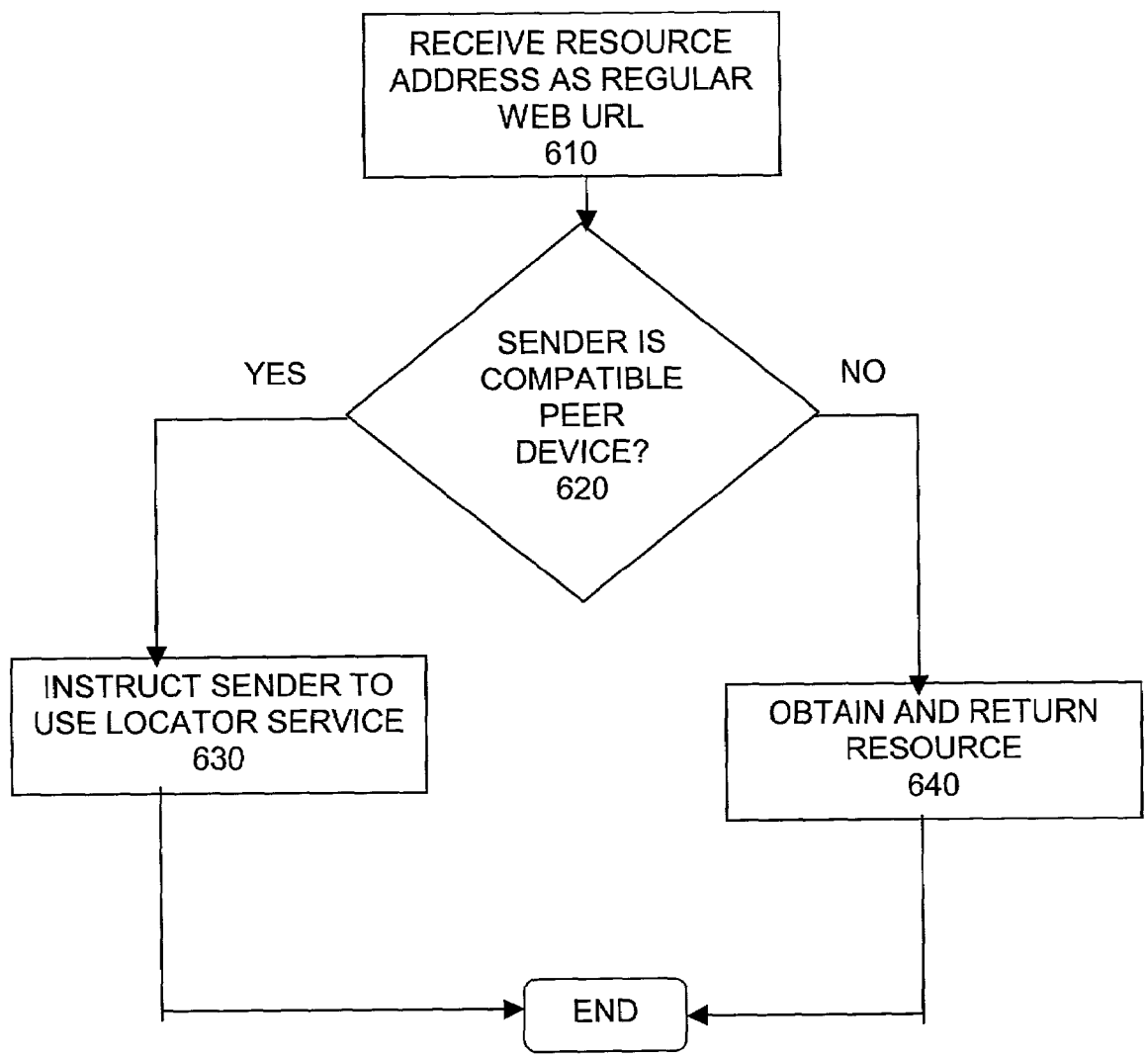
FIG. 6 demonstrates one embodiment of resolving a peer resource address.

FIG. 6 illustrates one embodiment of resolving a resource address from the perspective of a gate server.

At 610, the gate server receives a resource address as a regular Web URL.

At 620, if the requester is a compatible peer device, the gate server instructs the requester in 630 to use its own resource locator service to access the resource. In one embodiment, the gate server may be able to recognize that the requester is a peer device based on a special HTTP header included in the request by the requester. For instance, this can be a "Via" header that specifies the type of the requester as "compatible peer device". Alternately, the requester and the gate server may exchange additional messages to confirm compatibility. If the requester is a compatible peer device, the requester may cache the realm name to avoid sending resource addresses to the gate server in the future.

If the requester is not a peer device in 620, the gate server obtains the requested content and returns it to the requester in 640.

Resource Coherence

For resources that can be cached in multiple locations and that can change over time, cache coherency can be important. That is, if a resource is cached by multiple peers and then the master publisher updates the resource, it is important not to service requests using outdated cached data. "Coherent cache" means that valid cached copies of resources are equivalent to the master resource.

Depending on the type of resource, outdated data may or may not be a problem. For example, if the resource is an amateur "joke of the day" website, users may not care if cached data is a couple of days old. On the other hand, if the resource is stock ticker data on a day trader website, users will require fast updates. That is, higher priority data is likely to require more stringent cache coherency standards.

In order to account for multiple updates to a resource that maintains the same resource address, resource identifiers are used. A resource identifier for a given resource contains the resource address, as well as a resource version number. In one embodiment, resource identifiers are generated by platform 370, as follows: the resource address is generated as a combination of the realm under which the peer 140 has been registered, the peer's identifier, and the relative file system path of the published resource in the peer's publication directory 380; the resource version number is based on the last creation or modification time of that resource, as determined by peer-to-peer platform 370 by examining its publication directory 380.

Each time a master publisher creates or modifies a resource, the master publisher generates a new resource version number based on the date and time of the latest creation or modification of the resource.

In one embodiment, to ensure that resource version numbers are not influenced by variations in clock settings on peer machines, peers are synchronized to a central realm clock. Clock synchronization can be accomplished, for instance, when a peer machine comes on-line and informs its RNS server of the peer's current IP address. Furthermore, to ensure that clock drift on peer machines does not influence version numbering, peers can be re-synchronized to the central clock on a regular basis. In an alternate embodiment, version numbers can be generated sequentially by platform 370.

One approach to ensure highly coherent data is to enable only the master publisher to modify a resource and to require all requests to check the current resource identifier with the master publisher before each access. For instance, each time a resource is requested, the locator server queries the master publisher for the current version of the resource and returns the current version with a list of locations where the current version is expected to be found.

If a peer caches a resource and subsequently requests the resource again, even though a version of the resource is cached in the peer's own cache 385, the peer will not access the resource until the locator service returns the most recent version number and the peer has verified that its cached copy is the same version. If the version has changed, the requesting peer discards the obsolete version from its cache and accesses the new version of the resource from the list of sources supplied by the locator service.

If a peer 140 or the gate server 120 fetches a resource from a caching publisher, they can check to ensure that the version indication in the resource identifier matches the expected version that was returned as a result of a resource locator request. If the peer 140 sees a different version than expected, this may be due to the caching publisher caching an obsolete version of the resource. In this case, the peer 140 must try any other locations returned by the RNS server as a result of the locator request, or may elect to repeat the locator request altogether.

Proactively querying the master publisher can create a tremendous amount of data traffic for the master publisher. For instance, in a realm having millions of peers, if the master publisher for a resource is a desktop computer coupled to the network by a regular 56K modem, the master publisher could easily become a bottleneck for locator service traffic, even if locator service traffic uses a streamlined format.

A less problematic, yet somewhat lower level of coherency relies on the master publisher to report changes and/or modifications rather than proactively querying the master publisher for current versions. For instance, each time the master publisher publishes an updated version, the master publisher informs its home RNS server of the change. That is, the master publisher informs its home RNS server of the new resource identifier associated with the resource. If the RNS server has not received a notification from the master publisher, the RNS server assumes its current record for the requested resource is accurate. This was the case in the embodiment of FIG. 2.

The RNS server is likely to be running on a more robust machine, with a much higher bandwidth data connection for locator service traffic, than that of the master publisher. In which case, requests could be serviced by the RNS server prior to accessing a resource with a much lower likelihood of creating a bottleneck. Still, in a very large peer-to-peer realm, there is the possibility that a single home RNS server could become a bottleneck. Or, at the very least, this approach could consume a great deal of bandwidth that might better be spent elsewhere.

Rather than always requiring the verification of version numbers from a home RNS server or master publisher, another approach is to simply flush caches from time to time. If an RNS server currently has a record for a resource, the RNS server uses the record. If a peer has a cached copy of a resource, the peer uses the cached copy. The life span of a cached item can be adjusted based on the priority of the resource. Higher priority items can be flushed more often.

If authority to modify a resource is not limited to one master user, cache coherency is possible, but it can require a great deal more overhead. For instance, if a number of users cache a resource and collaboratively modify it, each new version created by each user could be broadcasted to all the other users, assuming the RNS servers tracked every location where the resource had been cached.

Any number of alternate approaches can be used for cache coherency, including combinations of the approaches described above. In certain embodiments, users have the option to select the level of cache coherency desired for various resources.

Figure 5:
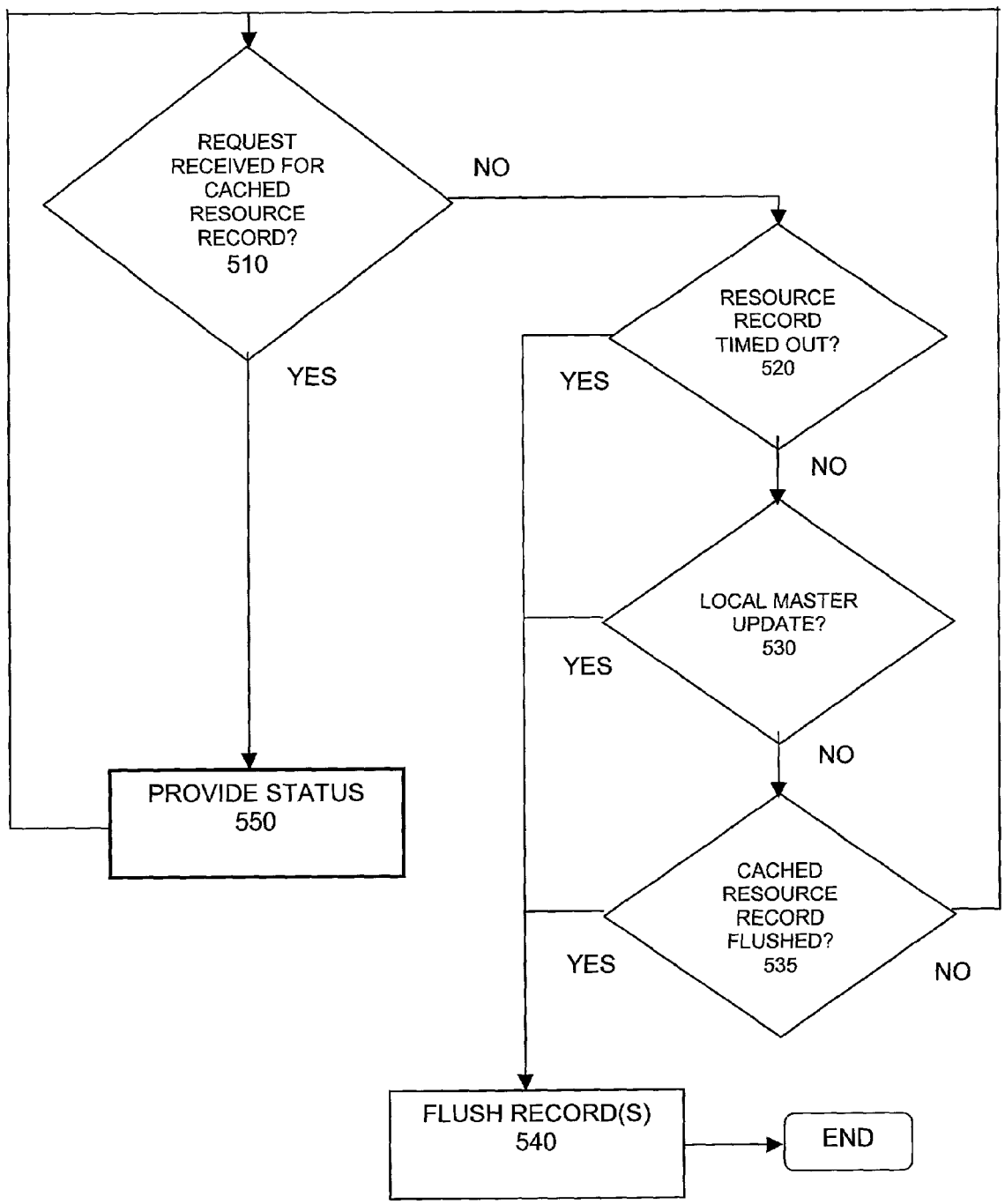
FIG. 5 demonstrates one embodiment of a cache coherency scheme.

FIG. 5 illustrates one embodiment of a cache coherency scheme for a particular record from the perspective of an RNS server. In the illustrated embodiment, a peer homed at the RNS server has previously accessed and cached a resource. The RNS server then cached a resource record listing the peer as a caching publisher for the resource, and also listing the resource identifier (including version indication) for the resource cached by the peer. The peer may be just one location among a list of several locations at which the resource is expected to be available.

At 510, the RNS server watches for a request for the cached record. While waiting, the RNS server watches to see if the cached record has timed out in 520. That is, the record has a time limit on how long the RNS server will cache it. If time has run out, the record is flushed in 540 and the process ends. The time limit may apply to the entire record referring to all the locations for a particular resource, or the time limit may only apply the caching publisher's location. If only the location of the caching publisher is flushed in 540, more recently cached locations for the resource may continue to be maintained in the resource record at the RNS server.

While waiting for a request for the cached record, the RNS server also watches to see if a local master has updated the resource in 530. That is, if the master publisher for the resource is also homed at this RNS server, the master publisher will inform the RNS server when the resource is updated by sending the RNS server a new resource identifier. In which case, the RNS server flushes the entire record of locations for the old version of the resource in 540.

In one embodiment, the master publisher can selectively inform its home RNS server of resource updates by only sending its home RNS server information about changed resources that had been previously looked up by the home RNS server (and for which the home RNS server thus has a cached resource record).

In one embodiment, the home RNS server can also notify the master publisher whenever the home RNS server chooses to discard the cached resource record for a resource. Following such a notification, the master publisher can temporarily stop sending change notifications for that resource to its home RNS server until, for instance, the resource is again looked up on the master publisher by the home RNS server.

In another embodiment, the home RNS server can reply to change notifications received from the master publisher after the cached resource record has been deleted with a status indication indicating to the master publisher that the master publisher may temporarily stop sending change notifications for that resource to its home RNS server, until the resource is again looked up on the master publisher by the home RNS server.

While waiting for a resource to time out or to be updated by the master publisher, the RNS server also watches to see if the caching publisher has flushed the resource in 535. If the peer no longer caches the resource, there is no reason to continue caching the peer's location with respect to the resource. In one embodiment, peer platforms notify their RNS servers when a new resource is created, when a resource is modified, and when a resource is deleted. The RNS servers update their records accordingly.

Back at 510, if a request for the cached record is received, the RNS server provides the cached status at 550. Note that the RNS server did not watch for resource modifications from a master publisher homed at a different RNS server. That is, in the illustrated embodiment, changes in the status of resources published by master publishers homed at remote RNS servers are ignored by the RNS server of FIG. 5. In other words, if a resource record has not timed out, the record is presumed valid. This approach can greatly reduce the amount of inter-RNS server traffic. A fairly high level of coherency can also be maintained by keeping the lifespan of records for remote master publishers short.

In alternate embodiments, any number of additional criteria can be used to flush records. For instance, if an RNS server runs low on memory space, it can flush records. Then, when more memory is available, an RNS server can re-create records by querying peers for the current status of published resources.

Implementation And Alternate Embodiments

Peers, such as peers 140 in FIG. 1, can include a wide variety of devices. In one embodiment, the peers are end-user machines, such as desk top computers, laptop computers, handheld devices, and the like. A peer can act like a client to request access to a resource available elsewhere in the networking environment, as well as act like a server to service requests for a resource available at the peer. Resources available at a peer may include files, directories of available files, devices attached to the peer, Web services, Microsoft .NET services, application instances, particular users (such as chat participants), and the like.

RNS locator service traffic requires only a small amount of data traffic compared to the amount of data involved in actually accessing most resources. In other words, a peer merely asks an RNS server where a resource can be found and then goes to that location or set of locations to actually access the resource. This two step process makes the RNS network exceptionally "scalable," which means it can support a vast number of peers and can grow rapidly without significant difficulty. For instance, since the first step uses very little data, the RNS servers can handle a very large number of these small requests per time unit. The bulk of the data traffic is exchanged directly among the peers. Adding capacity is as easy as adding more RNS servers and registering more peers.

In FIG. 1, the elements in realm 150 communicate with one another using any of a variety of network transmission protocols, such as the User Datagram Protocol (UDP) or the Transmission Control Protocol (TCP), and any of a variety of application protocols, such as a proprietary protocol, the Hypertext Transfer Protocol (HTTP), the File Transfer Protocol (FTP), or the like. The networking environment including realm 150 may comprise a local area network (LAN), a wide area network (WAN), a private internet, the public Internet, or the like. In alternate embodiments, realm 150 may comprise a standalone network.

The RNS service can use any number of security measures, including encryption, firewalls, and the like. A variety of protocol tools can also be used to accommodate unreliable networking environments where packets can be lost, can be received out-of-order, can be duplicated, etc. For instance, requests and responses can be pipelined and/or sent multiple times. Each transaction can include a "nonce," which is a unique identifier generated by the initiator of a transaction to distinguish among multiple replies to the same request.

Figure 7:
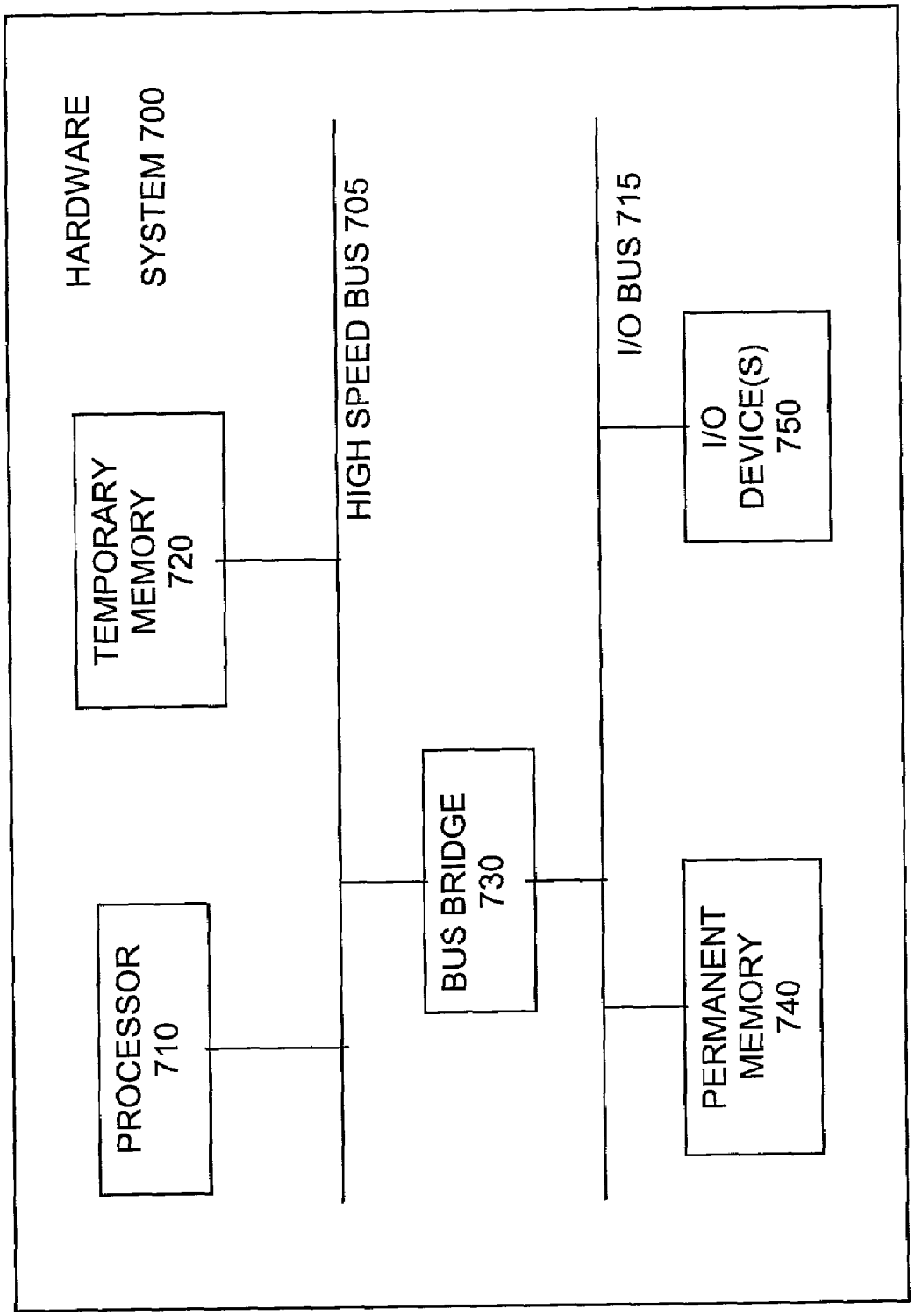
FIG. 7 illustrates one embodiment of a hardware system to perform the present invention.

FIG. 7 illustrates one embodiment of a hardware system 700 intended to represent a broad category of computer systems such as personal computers, workstations, and/or embedded systems. In the illustrated embodiment, the hardware system 700 includes processor 710 coupled to high speed bus 705, which is coupled to input/output (I/O) bus 715 through bus bridge 730. Temporary memory 720 is coupled to bus 705. Permanent memory 740 is coupled to bus 715. I/O device(s) 750 is also coupled to bus 715. I/O device(s) 750 may include a display device, a keyboard, one or more external network interfaces, etc.

Certain embodiments may include additional components, may not require all of the above components, or may combine one or more components. For instance, temporary memory 720 may be on-chip with processor 710. Alternately, permanent memory 740 may be eliminated and temporary memory 720 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternate internal networks including, for instance, an internal network based on a high speed system bus with a memory controller hub and an I/O controller hub. Additional components may include additional processors, a CD ROM drive, additional memories, and other peripheral components known in the art.

In one embodiment, the present invention, as described above, is implemented using one or more hardware systems such as the hardware system 700 of FIG. 7. Where more than one computer is used, the systems can be coupled to communicate over an external network, such as a local area network (LAN), an internet protocol (IP) network, etc. In one embodiment, the present invention is implemented as software routines executed by one or more execution units within the computer(s). For a given computer, the software routines can be stored on a storage device, such as permanent memory 740.

Alternately, as shown in FIG. 8, the software routines can be machine executable instructions 810 stored using any machine readable storage medium 820, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device(s) 750 of FIG. 7.

From whatever source, the instructions may be copied from the storage device into temporary memory 720 and then accessed and executed by processor 710. In one implementation, these software routines are written in the C programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with one or more of the above described functions of the present invention. In another example, one or more functions of the present invention could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, a Resource Naming Service is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A method performed by a resource naming system (RNS) server providing resource naming service in a peer-to-peer networking environment having different groups of peers assigned to different RNS servers, the method comprising:

receiving a peer resource request at the RNS server, said peer resource request having been sent by a peer platform through the peer-to-peer networking environment that the peer platform is participating in, the peer resource request comprising a peer resource identifier identifying a peer resource available on the peer-to-peer networking environment, tracking peers in the peer-to-peer networking environment that are assigned to the RNS server to determine whether those peers are connected to the peer-to-peer networking environment and in accordance with the tracking storing respective statuses of respective peers, a status indicating whether its corresponding peer is connected to the peer-to-peer networking environment;

generating a peer resource response based on the peer resource identifier and the statuses of the peers assigned to the RNS server, where indicia of a peer assigned to the RNS server is included in the peer resource response based on whether the peer resource identified in the peer resource request is available from the peers and based on whether the status of the peer indicates that the peer is connected to the peer-to-peer networking environment; and returning the peer resource response to the peer platform through the peer-to-peer networking environment, said peer resource response to enable the peer platform to access the peer resource within the peer-to-peer networking environment.

2. The method of claim 1 wherein the peer resource identifier comprises at least one of a realm name for a peer-to-peer realm including the RNS server and a path name for the peer resource.

3. The method of claim 2 wherein the peer resource identifier includes both the realm name and the path name, the peer resource identifier being persistent and/or unique within the peer-to-peer networking environment.

4. The method of claim 1 wherein the peer-to-peer networking environment comprises a local area network, a wide area network, a private internet, and/or a public Internet.

5. The method of claim 1 wherein the peer resource response comprises an indication of a current version of the peer resource.

6. The method of claim 1 wherein generating the peer resource response comprises:
   determining that resource status information regarding the peer resource is currently cached within the RNS server; and
   generating the peer resource response based on the cached resource status information.

7. The method of claim 6 wherein the resource status information corresponds to a peer resource assigned either to the RNS server receiving the peer resource request or to a remote RNS server.

8. The method of claim 1 wherein generating the peer resource response comprises:
   determining that a master publisher peer of the peer resource is assigned to the RNS server based on the peer resource request;
   requesting and receiving resource status information corresponding to the peer resource from the master publisher peer of the peer resource; and
   generating the peer resource response based on the resource status information corresponding to the peer resource.

9. The method of claim 8 wherein the RNS server has stored a list of the peers assigned to the RNS server, and wherein determining that the master publisher is homed at the RNS server comprises comparing the master publisher name to the list of peers assigned to the RNS server.

10. The method of claim 8 further comprising: caching the resource status information within the RNS server.

11. The method of claim 8 wherein the resource status information comprises a version number for the master resource, and wherein generating the peer resource response based on the resource status information comprises:
    comparing the version number from the resource status information to a version number for resource status information cached within the RNS server;
    generating the peer resource response based on the resource status information cached within the RNS server if the version numbers match; and
    generating the peer resource response based on the resource status information from the master publisher if the version numbers do not match.

12. The method of claim 1 wherein generating the peer resource response comprises:
    determining that master publisher status information corresponding to the peer resource is currently cached within the RNS server based on the peer resource request, said master publisher status information indicating an assigned RNS server for the master publisher of the peer resource;
    identifying a path name for the peer resource from the peer resource request;
    requesting and receiving resource status information corresponding to the peer resource from the assigned RNS server based on the master publisher status information and the path name; and
    generating the peer resource response based on the resource status information.

13. The method of claim 12 further comprising: caching the resource status information within the RNS server.

14. The method of claim 1 wherein generating the peer resource response comprises:
    identifying a master publisher name from the peer resource identifier;
    requesting and receiving master publisher status information corresponding to the master publisher name from a master publisher registrar, said master publisher status information indicating a home RNS server for the master publisher of the peer resource corresponding to the master publisher name;
    identifying a path name for the peer resource from the peer resource request;
    requesting and receiving resource status information corresponding to the peer resource from the home RNS server based on the master publisher status information and the path name; and
    generating the peer resource response based on the resource status information.

15. The method of claim 14 further comprising:
    caching the master publisher status information and/or the resource status information within the RNS server.

16. The method of claim 1 wherein generating the peer resource response comprises:
    selecting a set of network addresses from a plurality of network addresses where the peer resource is expected to be available in the peer-to-peer networking environment, said plurality of network addresses being cached in the RNS server, and where the indicia of the peer assigned to the RNS server comprises one of the network addresses; and
    including the set of network addresses in the peer resource response, said peer platform to select from among the set of network addresses to access the peer resource.

17. The method of claim 16 wherein the set of network addresses is selected from the plurality of network addresses in response to successive peer resource requests in a fashion that distributes access loads across said plurality of network addresses.

18. The method of claim 17 wherein selecting the set of network addresses from the plurality of network addresses in response to successive peer resource requests comprises:
    comparing a network address for the peer platform to each of the plurality of network addresses, said network address for the peer platform being part of the peer resource request, and a degree of relatedness between any two network addresses suggesting a related degree of topological closeness within the peer-to-peer networking environment; and
    selecting network addresses from among the plurality of network addresses that have a highest degree of relatedness to the network address for the peer platform.

19. The method of claim 1, wherein the RNS server comprises a local RNS server, and the peer resource request comprises a first peer resource request, the method further comprising:
    receiving a status request at the local RNS server, said status request corresponding to a local peer resource, and said status request being received from a remote RNS server through the peer-to-peer networking environment;
    generating a status response for the local peer resource; and
    returning the status response to the remote RNS server through the peer-to-peer networking environment, said status response to enable the remote RNS server to service a peer resource request for the local peer resource.

20. The method of claim 19 wherein said status response comprises at least one of a current version for the local peer resource and zero or more network addresses for the local peer resource.

21. The method of 19 wherein the status request comprises a realm name for a peer-to-peer realm including the RNS server, a unique master publisher name corresponding to a master publisher of the local peer resource, and/or a pathname for the local peer resource within the master publisher.

22. The method of claim 19 wherein a master publisher of the local peer resource is homed at the local RNS server.

23. The method of claim 19 further comprising:
caching the status response within the remote RNS server, said remote RNS server to service subsequent peer resource quests for the local peer resource based on the cached status response.

24. The method of claim 23 further comprising:
flushing the status response from the remote RNS server after a particular period of time.

25. A machine readable storage medium having stored thereon machine executable instructions to implement a method comprising:
receiving a peer resource request at a resource naming service (RNS) server, said peer resource request being received from a peer platform through a peer-to-peer networking environment, the peer resource request comprising a peer resource identifier identifying a peer resource;
determining and storing statuses of peers in the peer-to-peer networking environment that are assigned to the RNS server, the statuses indicating whether respective peers are available on the peer-to-peer networking environment;
generating a peer resource response based on the peer resource identifier and the determined statuses of the peers, where addresses or identifiers of peers are assigned to the RNS server are selected to be included in the peer resource response based on their having the peer resource and based on their previously stored statuses indicating whether they are available on the peer-to-peer networking environment; and
returning the peer resource response to the peer platform through the peer-to-peer networking environment, said peer resource response to enable the peer platform to access the peer resource within the peer-to-peer networking environment.

26. The machine readable storage medium of claim 25 wherein the peer resource identifier comprises a realm name for a peer-to-peer realm including the RNS server and/or a path name for the peer resource.

27. The machine readable storage medium of claim 26 wherein the peer resource identifier includes both the realm name and the path name, the peer resource identifier being persistent and/or unique within the networking environment.

28. The machine readable storage medium of claim 25 wherein the peer-to-peer networking environment comprises a local area network, a wide area network, a private internet, and the public Internet.

29. The machine readable storage medium of claim 25 wherein the peer resource response comprises an indication of a current version of the peer resource and/or a list of zero or more locations of peers within the peer-to-peer networking environment where the peer resource is expected to be available.

30. The machine readable storage medium of claim 25 wherein generating the peer resource response comprises: determining that resource status information regarding the peer resource is currently cached within the RNS server; and generating the peer resource response based on the cached resource status information.

31. The machine readable storage medium of claim 30 wherein the resource status information corresponds to a peer resource assigned either to the RNS server receiving the peer resource request or to a remote RNS server.

32. The machine readable storage medium of claim 25 wherein generating the peer resource response comprises: determining that a master publisher of the peer resource is homed at the RNS server based on the peer resource request; requesting and receiving resource status information corresponding to the peer resource from the master publisher of the peer resource; and generating the peer resource response based on the resource status information corresponding to the peer resource.

33. The machine readable storage medium of claim 32 wherein the RNS server has stored a list of the peers assigned to the RNS server, and wherein determining that the master publisher is homed to the RNS server comprises comparing the master publisher name from the peer resource identifier to the list of peers assigned to the RNS server.

34. The machine readable storage medium of claim 32 the method further comprising: caching the resource status information within the RNS server.

35. The machine readable storage medium of claim 32 wherein the resource status information comprises a version number for the master resource, and wherein generating the peer resource response based on the resource status information comprises: comparing the version number from the resource status information to a version number for resource status information cached within the RNS server; generating the peer resource response based on the resource status information cached within the RNS server if the version numbers match; and generating the peer resource response based on the resource status information from the master publisher if the version numbers do not match.

36. The machine readable storage medium of claim 25 wherein generating the peer resource response comprises: determining that master publisher status information corresponding to the peer resource is currently cached within the RNS server based on the peer resource request, said master publisher status information indicating an assigned RNS server for a master publisher of the peer resource; identifying a pathname for the peer resource from the peer resource request; requesting and receiving resource status information corresponding to the peer resource from the assigned RNS server based on the master publisher status information and the path name; and generating the peer resource response based on the resource status information.

37. The machine readable storage medium of claim 36, the method further comprising: caching the resource status information within the RNS server.

38. The machine readable storage medium of claim 25 wherein generating the peer resource response comprises: identifying a master publisher name from the peer resource identifier; requesting and receiving master publisher status information corresponding to the master publisher name from a master publisher registrar, said master publisher status information indicating a home RNS for a master publisher of the peer resource corresponding to the master publisher name; identifying a path name for the peer resource from the peer resource request; requesting and receiving resource status information corresponding to the peer resource from the home RNS server based on the master publisher status information and the path name; and generating the peer resource response based on the resource status information.

39. The machine readable storage medium of claim 38, the method further comprising: caching the master publisher status information and/or the resource status information within the RNS server.

40. The machine readable storage medium of claim 25 wherein generating the peer resource response comprises: selecting a set of network addresses from a plurality of network addresses where the peer resource is expected to be available in the peer-to-peer networking environment, said plurality of network addresses being cached in the RNS server; and including the set of network addresses in the peer resource response, said peer platform to select from among the set of network addresses to access the peer resource.

41. The machine readable storage medium of claim 40 wherein the set of network addresses is selected from the plurality of network addresses in response to successive peer resource requests in a fashion that distributes access loads across said plurality of network addresses.

42. The machine readable storage medium of claim 41 wherein selecting the set of network addresses from the plurality of network addresses in response to successive peer resource requests comprises: comparing a network address for the peer platform to each of the plurality of network addresses, said network address for the peer platform being part of the peer resource request, and a degree of relatedness between any two network addresses suggesting a related degree of topological closeness within the peer-to-peer networking environment; and selecting network addresses from among the plurality of network addresses that have a highest degree of relatedness to the network address for the peer platform.

43. The machine readable storage medium of claim 25, wherein the RNS server comprises a local RNS server, and the peer resource request comprises a first peer resource request, the method further comprising: receiving a status request at the local RNS server, said status request corresponding to a local peer resource, and said status request being received from a remote RNS server through the peer-to-peer networking environment; generating a status response for the local peer resource; and returning the status response to the remote RNS server through the peer-to-peer networking environment, said status response to enable the remote RNS server to service a peer resource request for the local peer resource.

44. The machine readable storage medium of claim 43 wherein said status response comprises a current version for the local peer resource and/or zero or more network addresses for the local peer resource.

45. The machine readable storage medium of claim 43 wherein the status request comprises a unique master publisher name corresponding to a master publisher of the local peer resource and/or a path name for the local peer resource within the master publisher.

46. The machine readable storage medium of claim 43 wherein a master publisher of the local peer resource is homed at the local RNS server.

47. The machine readable storage medium of claim 43, the method further comprising: caching the status response within the remote RNS server, said remote RNS server to service subsequent peer resource quests for the local peer resource based on the cached status response.

48. The machine readable storage medium of claim 47, the method further comprising: flushing the status response from the remote RNS server after a particular period of time.

49. An apparatus comprising:
  a resource naming service (RNS) server to receive a peer resource request, said peer resource request being received from a peer platform through a peer-to-peer networking environment, the peer resource request comprising a peer resource identifier identifying a peer resource available on the peer-to-peer networking environment;
  said RNS server to determine statuses of peers in the peer-to-peer networking environment that are assigned the RNS server as a home RNS server, the statuses indicating whether respective peers are connected to the peer-to-peer network, where as peers connect or disconnect to the peer-to-peer network their status changes accordingly;
  said RNS server to generate a peer resource response based on the peer resource request by identifying peers assigned to the RNS server that have cached or published the peer resource and that have statuses that indicate they are connected to the peer-to-peer network; and
  said RNS server to return the peer resource response to the peer platform through the peer-to-peer networking environment, said peer resource response to enable the peer platform to access the peer resource within the peer-to-peer networking environment.

* * * * *